United States Patent
Suga et al.

(10) Patent No.: US 11,024,461 B2
(45) Date of Patent: Jun. 1, 2021

(54) MULTI-LAYER CERAMIC ELECTRONIC COMPONENT HAVING EXTERNAL ELECTRODE WITH BASE FILM AND ELECTRICALLY CONDUCTIVE THIN FILM

(71) Applicant: Taiyo Yuden Co., Ltd., Tokyo (JP)

(72) Inventors: Yasutomo Suga, Tokyo (JP); Masataka Watabe, Tokyo (JP); Jun Nishikawa, Tokyo (JP); Sadayoshi Kato, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 16/562,731

(22) Filed: Sep. 6, 2019

(65) Prior Publication Data

US 2020/0082985 A1    Mar. 12, 2020

(30) Foreign Application Priority Data

Sep. 7, 2018 (JP) .............................. JP2018-167934

(51) Int. Cl.
*H01G 4/232* (2006.01)
*H01G 4/30* (2006.01)
*H01G 4/12* (2006.01)

(52) U.S. Cl.
CPC ............. *H01G 4/2325* (2013.01); *H01G 4/12* (2013.01); *H01G 4/30* (2013.01)

(58) Field of Classification Search
CPC ........ H01G 4/30; H01G 4/232; H01G 4/2325; H01G 4/12
See application file for complete search history.

(56) References Cited

U.S. PATENT DOCUMENTS

| 2013/0088810 A1* | 4/2013 | Yang ................... H01G 4/2325 |
| | | 361/306.3 |
| 2013/0128411 A1* | 5/2013 | Tahara .................... H01G 4/30 |
| | | 361/321.2 |

(Continued)

FOREIGN PATENT DOCUMENTS

| CN | 104299784 A | * | 1/2015 | ............. H01G 4/005 |
| JP | 10284343 A | * | 10/1998 | ............. H01G 4/005 |
| JP | 2015-65394 A | | 4/2015 | |

*Primary Examiner* — David M Sinclair
(74) *Attorney, Agent, or Firm* — Saliwanchik, Lloyd & Eisenschenk (57) ABSTRACT

A multi-layer ceramic electronic component includes: a ceramic body including a main surface facing in a first direction, an end surface facing in a second direction orthogonal to the first direction, a side surface facing in a third direction orthogonal to the first and second directions, and internal electrodes laminated in the first direction; and an external electrode formed on a surface of the ceramic body, the external electrode including a base film including an end-surface-covering portion that covers the end surface, and a main-surface-covering portion that covers part of the main surface continuously from the end-surface-covering portion, an electrically conductive thin film including a base-covering portion that covers the main-surface-covering portion, and a ceramic-body-covering portion that extends from the base-covering portion in the second direction and covers part of the main surface, and a plating film that covers the electrically conductive thin film and the base film.

4 Claims, 4 Drawing Sheets

(56) References Cited

U.S. PATENT DOCUMENTS

| | | | |
|---|---|---|---|
| 2013/0208401 A1* | 8/2013 | Shirakawa | H01G 4/008 361/305 |
| 2015/0083475 A1 | 3/2015 | Kim et al. | |
| 2016/0042868 A1* | 2/2016 | Otsuka | H01G 4/30 361/301.4 |

* cited by examiner

MULTI-LAYER CERAMIC ELECTRONIC COMPONENT HAVING EXTERNAL ELECTRODE WITH BASE FILM AND ELECTRICALLY CONDUCTIVE THIN FILM

CROSS-REFERENCE TO RELATED APPLICATION

This application claims priority to Japanese Application No. 2018-167934, filed Sep. 7, 2018, which is hereby incorporated by reference in its entirety.

BACKGROUND

The present disclosure relates to a low-profile multi-layer ceramic electronic component.

Along with miniaturization of electronic devices, there are demands for reduction in height of multi-layer ceramic electronic components. Japanese Patent Application Laid-open No. 2015-65394 (hereinafter, referred to as Patent Document 1) discloses a low-profile multi-layer ceramic capacitor. This multi-layer ceramic capacitor includes first and second external electrodes, which include first and second base electrodes, conductive thin film layers, and plating layers, and on which band surfaces having a predetermined length or greater are formed. The conductive thin film layers are extended so as to cover corner portions of a ceramic main body.

SUMMARY

In the multi-layer ceramic capacitor disclosed in Patent Document 1, the peeling of the conductive thin film layers has occurred in some cases, and it has been difficult to enhance reliability of the external electrodes.

In view of the circumstances as described above, it is desirable to provide a multi-layer ceramic electronic component capable of enhancing reliability of an external electrode.

According to an embodiment of the present disclosure, there is provided a multi-layer ceramic electronic component including a ceramic body and an external electrode formed on a surface of the ceramic body.

The ceramic body includes a main surface facing in a first direction, an end surface facing in a second direction orthogonal to the first direction, a side surface facing in a third direction orthogonal to the first direction and the second direction, and internal electrodes laminated in the first direction.

The external electrode includes a base film, an electrically conductive thin film, and a plating film.

The base film includes an end-surface-covering portion that covers the end surface, and a main-surface-covering portion that covers part of the main surface continuously from the end-surface-covering portion.

The electrically conductive thin film includes a base-covering portion that covers the main-surface-covering portion, and a ceramic-body-covering portion that extends from the base-covering portion in the second direction and covers part of the main surface.

The plating film covers the electrically conductive thin film and the base film.

In the configuration described above, the electrically conductive thin film is formed on the base film extended to the main surface. The base film is extended to the main surface, which can enhance adhesion of the electrically conductive thin film. This can also suppress infiltration of moisture from the base film in an effective manner, enhance moisture resistance, and inhibit failures such as a short circuit from occurring in the external electrode. Therefore, it is possible to enhance connection reliability of the external electrode.

The main-surface-covering portion may have a main-surface-covering dimension of 10 μm or more in the second direction from an outer edge portion of the main surface in the second direction.

Accordingly, it is possible to satisfactorily form the base film on the main surface and enhance connection reliability of the external electrode.

Further, the main-surface-covering portion may have a main-surface-covering dimension of 100 μm or less in the second direction from an outer edge portion of the main surface in the second direction.

Additionally, the main-surface-covering dimension may be 70 μm or less.

Accordingly, a region in which the external electrode is to be formed can be limited, and stress to be applied to the ceramic body by the external electrode can be suppressed. Therefore, it is possible to inhibit the ceramic body from being broken even if the ceramic body is formed to be low in height.

Further, the ceramic body may have a ceramic body height dimension of 30 μm or more and 60 μm or less in the first direction, and the main-surface-covering portion may have a main-surface-covering dimension in the second direction from an outer edge portion of the main surface in the second direction, the main-surface-covering dimension being smaller than the ceramic body height dimension.

Accordingly, it is possible to satisfactorily inhibit moisture from infiltrating from the base film and going around the end surface and to improve moisture resistance.

As described above, according to the present disclosure, it is possible to provide a multi-layer ceramic electronic component capable of enhancing reliability of an external electrode.

These and other objects, features and advantages of the present disclosure will become more apparent in light of the following detailed description of embodiments thereof, as illustrated in the accompanying drawings.

DETAILED DESCRIPTION OF EMBODIMENTS

Hereinafter, an embodiment of the present disclosure will be described with reference to the drawings.

In the figures, an X axis, a Y axis, and a Z axis orthogonal to one another are shown as appropriate. The X axis, the Y axis, and the Z axis are common in all figures.

1. OVERALL CONFIGURATION OF MULTI-LAYER CERAMIC CAPACITOR 10

Figure 1:
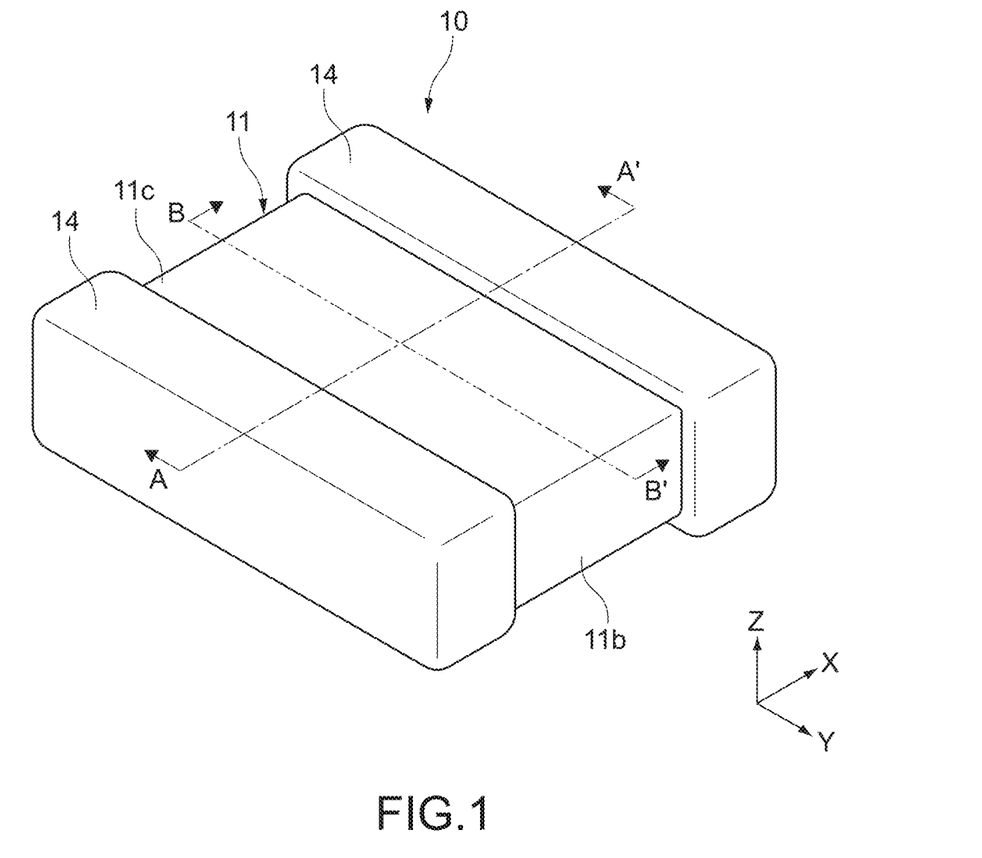
FIG. 1 is a perspective view schematically showing a multi-layer ceramic capacitor according to an embodiment of the present disclosure.
Figure 2:
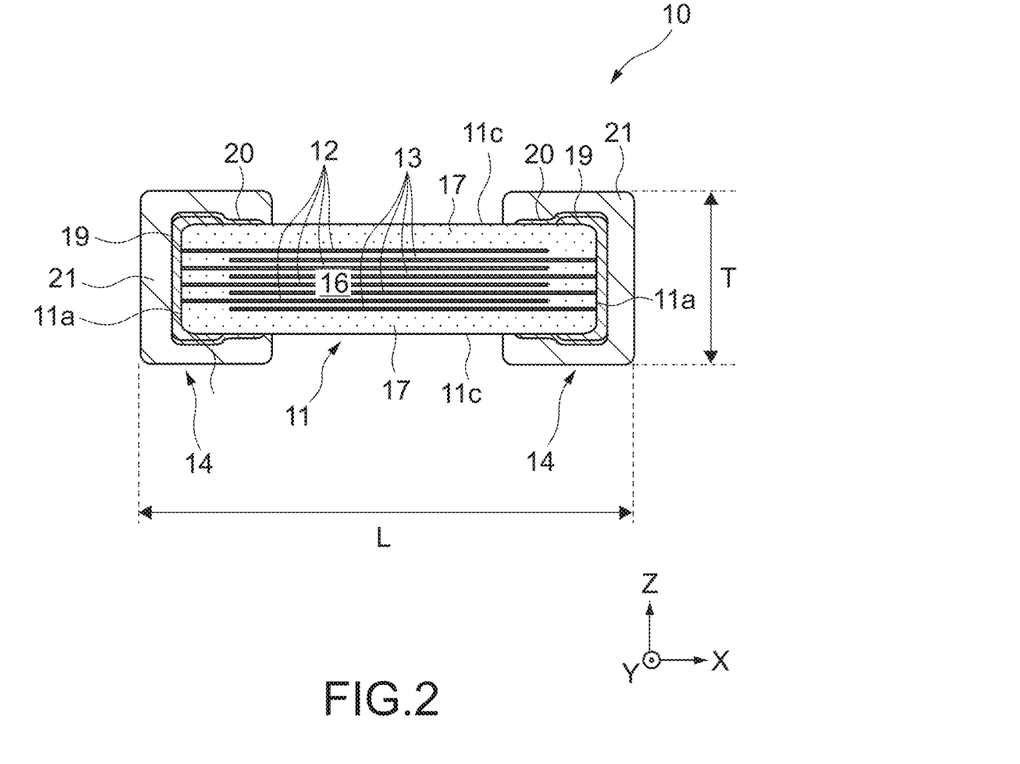
FIG. 2 is a cross-sectional view of the multi-layer ceramic capacitor taken along the A-A' line in FIG. 1.
Figure 3:
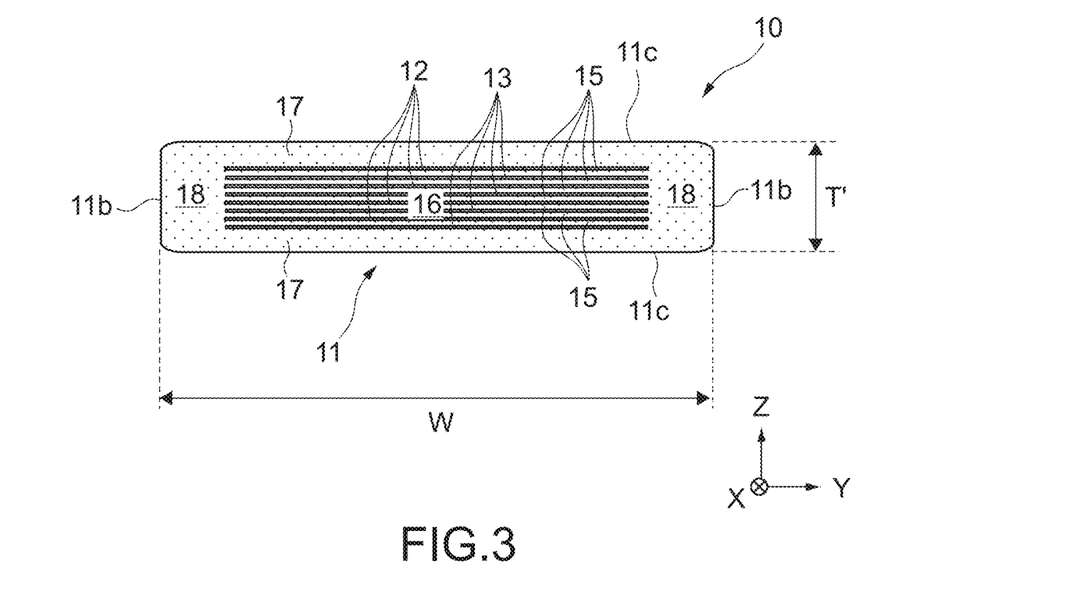
FIG. 3 is a cross-sectional view of the multi-layer ceramic capacitor taken along the B-B' line in FIG. 1.

FIGS. 1 to 3 each show a multi-layer ceramic capacitor 10 according to an embodiment of the present disclosure. FIG.

1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11 and two external electrodes 14. Each of the external electrodes 14 is formed on the surface of the ceramic body 11.

The ceramic body 11 has a substantially hexahedral shape. In other words, the ceramic body 11 has two end surfaces 11a facing in the X-axis direction, two side surfaces 11b facing in the Y-axis direction, and two main surfaces 11c facing in the Z-axis direction. Each surface does not include a difference in level or the like and may have a uniform surface. The ceramic body 11 does not need to have the hexahedral shape in a precise sense. For example, ridges connecting the respective surfaces may be chamfered and may be curved.

Regarding the size of the multi-layer ceramic capacitor 10, for example, a dimension L in the X-axis direction is in the range of 0.2 mm to 2.0 mm, and a dimension W in the Y-axis direction is in the range of 0.2 mm to 2.0 mm. The multi-layer ceramic capacitor 10 may have a long side in any of the X-axis direction and the Y-axis direction. In the example shown in FIGS. 1 to 3, the multi-layer ceramic capacitor 10 has a long side in the Y-axis direction. A dimension T of the multi-layer ceramic capacitor 10 in the Z-axis direction is, for example, 100 μm or less, and is configured to be low in height. A ceramic body height dimension T' of the ceramic body 11 in the Z-axis direction is, for example, 30 μm or more and 60 μm or less. It should be noted that each dimension of the multi-layer ceramic capacitor 10 is assumed as a dimension of a largest portion along each direction.

The ceramic body 11 includes a capacitance forming unit 16, covers 17, and side margins 18. The capacitance forming unit 16 is disposed at the center portion of the ceramic body 11 in the Y- and Z-axis directions. The covers 17 cover the capacitance forming unit 16 from the Z-axis direction, and the side margins 18 cover the capacitance forming unit 16 from the Y-axis direction.

More specifically, the covers 17 are disposed on both sides of the capacitance forming unit 16 in the Z-axis direction. The side margins 18 are disposed on both sides of the capacitance forming unit 16 in the Y-axis direction. The covers 17 and the side margins 18 have main functions of protecting the capacitance forming unit 16 and ensuring insulation properties of the periphery of the capacitance forming unit 16.

The capacitance forming unit 16 includes a plurality of first internal electrodes 12, and a plurality of second internal electrodes 13, which are laminated in the Z-axis direction via ceramic layers 15 (see FIG. 3). The first internal electrodes 12 and the second internal electrodes 13 each have a sheet-like shape extending along the X-Y plane and are alternately disposed along the Z-axis direction.

Figure 4:
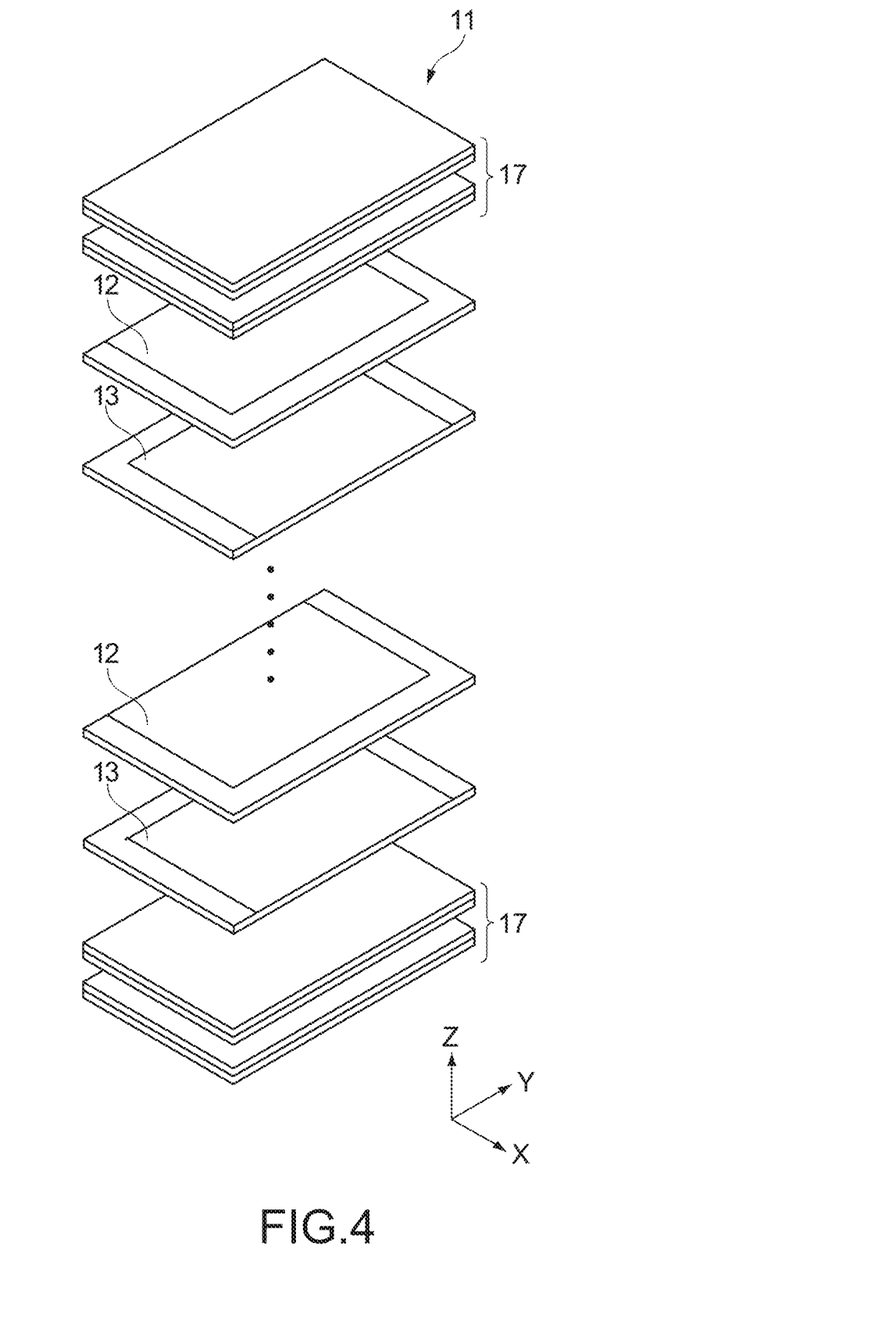
FIG. 4 is an exploded perspective view of a ceramic body of the multi-layer ceramic capacitor.

FIG. 4 is an exploded perspective view of the ceramic body 11. The ceramic body 11 has a structure in which sheets are laminated as shown in FIG. 4. The capacitance forming unit 16 and the side margins 18 can be formed of sheets on which the first internal electrodes 12 and the second internal electrodes 13 are printed. The covers 17 can be formed of sheets on which the first internal electrodes 12 and the second internal electrodes 13 are not printed.

The first internal electrodes 12 and the second internal electrodes 13 are each formed of a good conductor of electricity and function as internal electrodes of the multi-layer ceramic capacitor 10. Examples of the good conductor of electricity forming the first and second internal electrodes 12 and 13 include a metal mainly containing nickel (Ni), copper (Cu), palladium (Pd), platinum (Pt), silver (Ag), gold (Au), or the like, and an alloy of those metals.

As shown in FIG. 2, the first internal electrodes 12 are drawn to one of the end surfaces 11a of the ceramic body 11 and connected to one of the external electrodes 14. The second internal electrodes 13 are drawn to the other end surface 11a of the ceramic body 11 and connected to the other external electrode 14. With this configuration, the first internal electrodes 12 and the second internal electrodes 13 are electrically continuous with the different external electrodes 14.

The ceramic layer 15 is formed of dielectric ceramics. In the multi-layer ceramic capacitor 10, in order to increase a capacitance of each ceramic layer 15 provided between the first internal electrode 12 and the second internal electrode 13, dielectric ceramics having a high dielectric constant is used. Examples of the dielectric ceramics having a high dielectric constant include a material having a Perovskite structure containing barium (Ba) and titanium (Ti), which is typified by barium titanate ($BaTiO_3$).

Further, examples of the dielectric ceramics may include a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, and a titanium oxide ($TiO_2$) based material, other than a barium titanate based material.

The covers 17 and the side margins 18 are also formed of dielectric ceramics. The material forming the covers 17 and the side margins 18 only needs to be insulating ceramics, but if a material having a composition system similar to that of the capacitance forming unit 16 is used therefor, production efficiency is increased, and internal stress in the ceramic body 11 is suppressed.

With the configuration described above, when a voltage is applied between the external electrodes 14 in the multi-layer ceramic capacitor 10, the voltage is applied to the plurality of ceramic layers 15 provided between the first internal electrodes 12 and the second internal electrodes 13 in the capacitance forming unit 16. With this configuration, the multi-layer ceramic capacitor 10 stores charge corresponding to the voltage applied between the external electrodes 14.

2. CONFIGURATION OF EXTERNAL ELECTRODES 14

As shown in FIG. 2, the external electrodes 14 cover the respective end surfaces 11a and extend to the main surfaces 11c. Accordingly, via holes or the like can be provided in the regions of the external electrodes 14 on the main surfaces 11c. This facilitates connection with external wiring.

Each of the external electrodes 14 has a three-layer structure. Specifically, the external electrode 14 includes a base film 19, an electrically conductive thin film 20, and a plating film 21.

The base film 19 covers the end surface 11a and part of the main surface 11c. The base film 19 may contain nickel (Ni), copper (Cu), palladium (Pd), platinum (Pt), silver (Ag), gold (Au), or the like as a main component. The base film 19 can be formed by applying an electrically conductive paste by applying by dipping or printing, for example, and then baking it.

The electrically conductive thin film 20 covers the base film 19 and part of the main surface 11c from the Z-axis direction. The electrically conductive thin film 20 may contain copper (Cu), nickel (Ni), palladium (Pd), platinum (Pt), silver (Ag), gold (Au), or the like as a main component. The electrically conductive thin film 20 is a sputtering film formed by sputtering, for example, but may be formed by spraying, printing, or the like. The electrically conductive thin film 20 can be a base for the plating film 21 on the main surfaces 11c.

The plating film 21 covers the whole of the base film 19 and the electrically conductive thin film 20. The plating film 21 is a film formed by plating such as electrolytic plating and has a single-layer or multi-layer structure. The plating film 21 may contain copper (Cu), nickel (Ni), tin (Sn), platinum (Pt), palladium (Pd), gold (Au), or the like as a main component.

Figure 5:
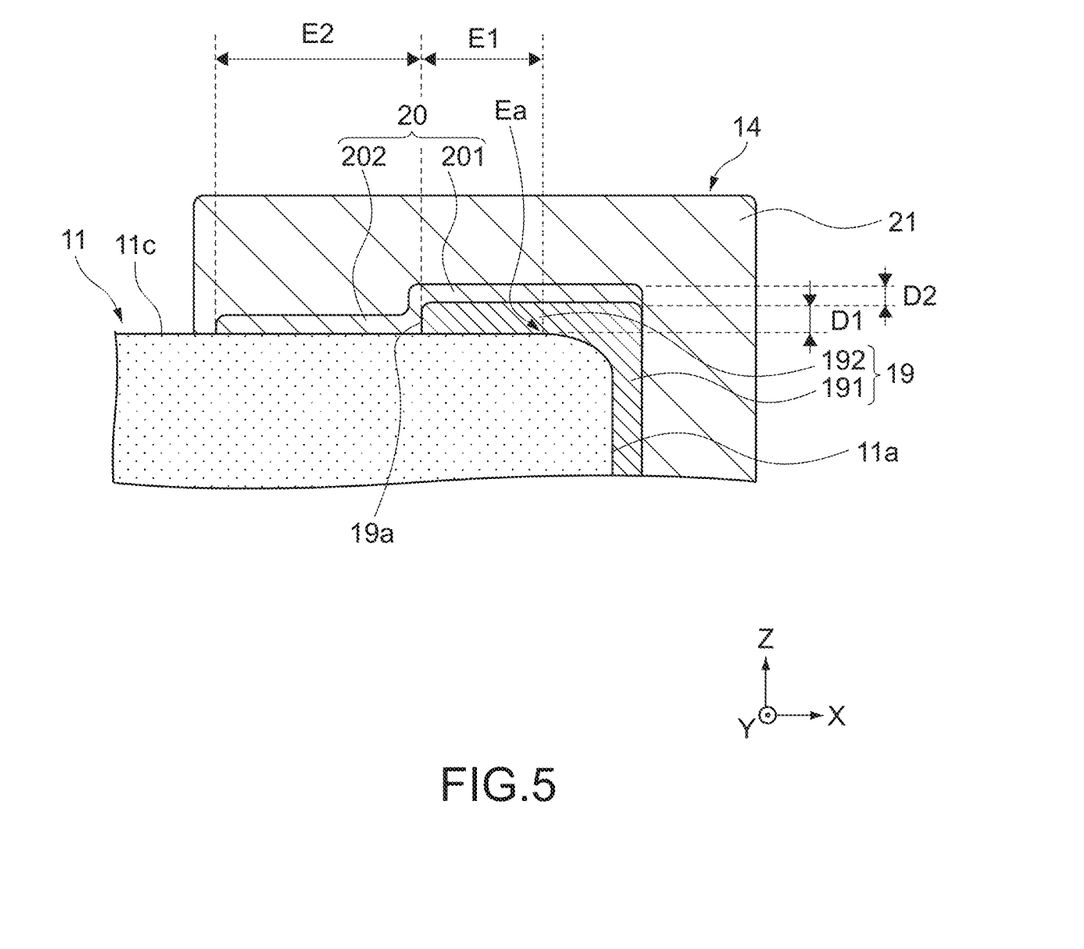
FIG. 5 is a partially enlarged view of FIG. 2.

FIG. 5 is an enlarged view of a main part of FIG. 2 and a view showing a detailed configuration of the external electrode 14. It should be noted that FIG. 5 shows a configuration of one main surface 11c side of the external electrode 14, but the same holds true for a configuration of the other main surface 11c side of the external electrode 14.

As shown in FIG. 5, the base film 19 includes an end-surface-covering portion 191 and a main-surface-covering portion 192. The end-surface-covering portion 191 covers the end surface 11a. The main-surface-covering portion 192 extends from the end-surface-covering portion 191 and covers part of the main surface 11c across the ridge of the ceramic body 11. The main-surface-covering portion 192 is formed integrally with and continuously from the end-surface-covering portion 191. A thickness dimension D1 of the main-surface-covering portion 192 in the Z-axis direction is, for example, 0.5 to 5.0 It should be noted that the thickness dimension D1 of the main-surface-covering portion 192 is assumed as a largest dimension in the dimensions from the main surface 11c to the surface of the main-surface-covering portion 192 along the Z-axis direction.

The main surface 11c only needs to be a substantially uniform surface and does not include a difference in level or the like. It is assumed that irregularities and inclination within a small range of 1% of the height dimension T' of the ceramic body 11 are allowable in the main surface 11c. As shown in FIG. 5, an outer edge of the main surface 11c in the X-axis direction is represented as an outer edge portion Ea.

The base film 19 is extended by continuously going around from the end surface 11a to the main surface 11c. This allows occurrence of a failure such as peeling of the external electrode 14 from the surface of the ceramic body 11 to be suppressed, and also allows infiltration of a plating solution in between the base film 19 and the ceramic body 11 to be suppressed. Additionally, it is possible to inhibit moisture from going to the end surface 11a side through a gap between the base film 19 and the ceramic body 11 and also possible to enhance moisture resistance.

In addition, an end portion 19a of the base film 19 in the X-axis direction is formed on the main surface 11c, and thus structures such as a fine difference in level are not formed around the end portion 19a. Accordingly, the electrically conductive thin film 20 can reliably cover the end portion 19a, and breakage of the electrically conductive thin film 20, such as cracks, can be inhibited from occurring in the vicinity of the end portion 19a.

In the main-surface-covering portion 192, a main-surface-covering dimension E1 in the X-axis direction from the outer edge portion Ea of the main surface 11c is larger than 0 and a lower limit of the main-surface-covering dimension E1 is favorably 10 μm or more, more favorably 20 μm or more. Accordingly, the peeling defect described above can be suppressed more reliably.

Further, an upper limit of the main-surface-covering dimension E1 is favorably 100 μm or less, more favorably 70 μm or less. Accordingly, stress given to the ceramic body 11 by the external electrode 14 can be reduced, and the ceramic body 11 can be inhibited from being broken.

The electrically conductive thin film 20 includes a base-film-covering portion 201 and a ceramic-body-covering portion 202. The base-film-covering portion 201 covers the main-surface-covering portion 192. The ceramic-body-covering portion 202 extends from the base-film-covering portion 201 in the X-axis direction and covers part of the main surface 11c. The base-film-covering portion 201 and the ceramic-body-covering portion 202 are formed continuously integrally with each other. Accordingly, the end portion 19a of the base film 19 in the X-axis direction is reliably covered with the electrically conductive thin film 20. Therefore, peeling of the base film 19 can be more reliably inhibited, and adhesion of the electrically conductive thin film 20 can be enhanced.

A thickness dimension D2 of the base-film-covering portion 201 in the Z-axis direction is 0.1 μm to 0.2 μm, for example.

Further, in the ceramic-body-covering portion 202, a ceramic-body-covering dimension E2 from the end portion 19a of the base film 19 (main-surface-covering portion 192) in the X-axis direction is, for example, 100 to 200 favorably 100 to 190 Accordingly, the electrically conductive thin film 20 can reliably cover the end portion 19a of the base film 19, and adhesion of the electrically conductive thin film 20 with respect to the ceramic body 11 can be enhanced. Therefore, an effect of suppressing the peeling of the external electrode 14 from the ceramic body 11 can be enhanced. Further, infiltration of moisture from the base film 19 can be effectively inhibited, and moisture resistance can also be enhanced.

The plating film 21 serves as the outer layer of the external electrode 14. The plating film 21 is configured to cover the end-surface-covering portion 191 of the base film 19 on the end surface 11a and to cover the electrically conductive thin film 20 on the main surface 11c.

With the external electrode 14 having the configuration described above, the peeling of the base film 19 and the electrically conductive thin film 20 can be effectively suppressed. Additionally, it is possible to inhibit moisture from infiltrating from the base film 19 and to enhance moisture resistance. Therefore, it is possible to satisfactorily enhance the reliability of the external electrode 14.

3. EXAMPLES AND COMPARATIVE EXAMPLES

Samples of the multi-layer ceramic capacitor 10 were produced as follows.

First, a ceramic green sheet having the thickness of 1.0 μm was formed of a ferroelectric material such as $BaTiO_3$. An internal electrode pattern was formed on the ceramic green sheet by printing or the like. A predetermined number of ceramic green sheets on each of which the internal electrode pattern is formed, and a predetermined number of ceramic green sheets on each of which the internal electrode pattern is not formed, are laminated, and the laminate as shown in FIG. 4 was produced. The laminate was pressure-bonded and cut at predetermined positions to produce unsintered multi-layer chips.

An electrically conductive paste mainly containing nickel was applied to the end surface and part of the main surface of the unsintered multi-layer chip by dipping. At that time, the unsintered multi-layer chip was immersed into a dip tank from the end surface of the multi-layer chip to the part of the main surface and side surface thereof, and the electrically conductive paste was integrally applied to the end surface, the main surface, and the side surface. The multi-layer chip to which the electrically conductive paste was applied was sintered at a temperature of 1,000 to 1,400° C., and a sintered body including the base film 19 formed on the ceramic body 11 was produced. In the sintered base film 19, a thickness dimension from the main surface 11c was 1.5 µm.

The sintered body was masked at a predetermined position on the main surface side, and the electrically conductive thin film 20 containing copper as a main component was formed on the main surface 11c and the base film 19 by sputtering. The thickness of the electrically conductive thin film 20 was 0.1 to 0.2 µm. Additionally, with the electrically conductive thin film 20 and the base film 19 being used as a base, the plating film 21 containing copper of 4 µm, nickel of 2 µm, and tin of 4 µm was formed by electrolytic plating in order from the base side, and the samples of the multi-layer ceramic capacitor 10 were obtained.

Regarding the dimensions of the samples of the multi-layer ceramic capacitor 10, as shown in Tables 1 and 2, a dimension L in the X-axis direction was set to 600 to 1,000 µm, a dimension W in the Y-axis direction was set to 500 to 1,000 µm, and a height dimension T in the Z-axis direction was set to 50 to 99 µm. Further, a height dimension T' of the ceramic body 11 in the Z-axis direction was set to 30 µm to 79 µm. For the dimensions of the respective portions of the external electrode 14, the main-surface-covering dimension E1 of the base film 19 in the X-axis direction was set to 0 to 100 µm, and the ceramic-body-covering dimension E2 of the electrically conductive thin film 20 in the X-axis direction was set to 100 to 200 µm. It should be noted that the main-surface-covering dimension E1 of the base film 19 in the X-axis direction uses the outer edge portion Ea of the main surface 11c as the point of origin.

1,000 samples were produced for each size, and a peeling defect rate of the external electrode 14 was calculated therefor. For the peeling defect rate, the outer appearance of each sample was observed using a stereo microscope at a 40-fold magnification, and the number of samples in which peeling defects were found, among the 1,000 samples, was calculated.

Table 1 and Table 2 show the results.

TABLE 1

| Sample size (µm) | | | (µm) | Base film (µm) Main-surface-covering dimension E1 | Electrically conductive thin film (µm) Ceramic-body-covering dimension E2 | (%) Peeling defect rate |
|---|---|---|---|---|---|---|
| L | W | T | T' | | | |
| 600 | 1000 | 99 | 79 | 0 | 200 | 0.9 |
| 600 | 1000 | 99 | 79 | 5 | 195 | 0 |
| 600 | 1000 | 99 | 79 | 10 | 190 | 0 |
| 600 | 1000 | 99 | 79 | 20 | 180 | 0 |
| 600 | 1000 | 99 | 79 | 40 | 160 | 0 |
| 600 | 1000 | 99 | 79 | 55 | 145 | 0 |
| 600 | 1000 | 99 | 79 | 70 | 130 | 0 |
| 600 | 1000 | 99 | 79 | 100 | 100 | 0 |
| 600 | 1000 | 74 | 54 | 0 | 200 | 1.1 |
| 600 | 1000 | 74 | 54 | 5 | 195 | 0.2 |
| 600 | 1000 | 74 | 54 | 10 | 190 | 0 |
| 600 | 1000 | 74 | 54 | 20 | 180 | 0 |
| 600 | 1000 | 74 | 54 | 40 | 160 | 0 |
| 600 | 1000 | 74 | 54 | 55 | 145 | 0 |
| 600 | 1000 | 74 | 54 | 70 | 130 | 0 |
| 600 | 1000 | 74 | 54 | 100 | 100 | 0 |
| 1000 | 500 | 99 | 79 | 0 | 200 | 0.6 |
| 1000 | 500 | 99 | 79 | 5 | 195 | 0.1 |
| 1000 | 500 | 99 | 79 | 10 | 190 | 0 |
| 1000 | 500 | 99 | 79 | 20 | 180 | 0 |
| 1000 | 500 | 99 | 79 | 40 | 160 | 0 |
| 1000 | 500 | 99 | 79 | 55 | 145 | 0 |
| 1000 | 500 | 99 | 79 | 70 | 130 | 0 |
| 1000 | 500 | 99 | 79 | 100 | 100 | 0 |

TABLE 2

| Sample size (µm) | | | (µm) | Base film (µm) Main-surface-covering dimension E1 | Electrically conductive thin film (µm) Ceramic-body-covering dimension E2 | (%) Peeling defect rate |
|---|---|---|---|---|---|---|
| L | W | T | T' | | | |
| 1000 | 500 | 50 | 30 | 0 | 200 | 0.5 |
| 1000 | 500 | 50 | 30 | 5 | 195 | 0 |
| 1000 | 500 | 50 | 30 | 10 | 190 | 0 |

TABLE 2-continued

| Sample size (μm) | | | (μm) | Base film (μm) Main-surface-covering dimension E1 | Electrically conductive thin film (μm) Ceramic-body-covering dimension E2 | (%) Peeling defect rate |
|---|---|---|---|---|---|---|
| L | W | T | T' | | | |
| 1000 | 500 | 50 | 30 | 20 | 180 | 0 |
| 1000 | 500 | 50 | 30 | 40 | 160 | 0 |
| 1000 | 500 | 50 | 30 | 55 | 145 | 0 |
| 1000 | 500 | 50 | 30 | 70 | 130 | 0 |
| 1000 | 500 | 50 | 30 | 100 | 100 | 0 |
| 1000 | 500 | 63 | 43 | 0 | 200 | 0.5 |
| 1000 | 500 | 63 | 43 | 5 | 195 | 0 |
| 1000 | 500 | 63 | 43 | 10 | 190 | 0 |
| 1000 | 500 | 63 | 43 | 20 | 180 | 0 |
| 1000 | 500 | 63 | 43 | 40 | 160 | 0 |
| 1000 | 500 | 63 | 43 | 55 | 145 | 0 |
| 1000 | 500 | 63 | 43 | 70 | 130 | 0 |
| 1000 | 500 | 63 | 43 | 100 | 100 | 0 |
| 600 | 300 | 90 | 60 | 0 | 200 | 0.3 |
| 600 | 300 | 90 | 60 | 5 | 195 | 0 |
| 600 | 300 | 90 | 60 | 10 | 190 | 0 |
| 600 | 300 | 90 | 60 | 20 | 180 | 0 |
| 600 | 300 | 90 | 60 | 40 | 160 | 0 |
| 600 | 300 | 90 | 60 | 55 | 145 | 0 |
| 600 | 300 | 90 | 60 | 70 | 130 | 0 |
| 600 | 300 | 90 | 60 | 100 | 100 | 0 |

Regarding the samples of the respective sizes, in a case where the main-surface-covering dimension E1 of the base film 19 was 0 μm, a peeling defect of approximately 0.5 to 1.1% occurred. Meanwhile, in a case where the main-surface-covering dimension E1 of the base film 19 was larger than 0 μm, i.e., the main-surface-covering dimension E1 was 5 to 100 μm, the peeling defect rate was 0.2% or less in each case. In particular, in a case where the main-surface-covering dimension E1 of the base film 19 was 10 μm or more, the samples having any size had the peeling defect rate of 0%.

Subsequently, a moisture resistance test was performed on 100 samples each having the size in which the length dimension L was set to 600 μm, and the width dimension W was set to 1,000 μm. Specifically, samples to be tested were disposed under an environment of a temperature of 85° C. and a humidity of 85%, and a voltage of 12 V was applied thereto via the external electrodes 14 for 500 hours. At that time, samples in which a short circuit occurred were counted as defectives in moisture resistance. Table 3 shows the results.

TABLE 3

| Sample size (μm) | | | (μm) | Base film (μm) Main-surface-covering dimension E1 | Electrically conductive thin film (μm) Ceramic-body-covering dimension E2 | Number of defectives in moisture resistance |
|---|---|---|---|---|---|---|
| L | W | T | T' | | | |
| 600 | 1000 | 99 | 79 | 0 | 200 | 1/100 |
| 600 | 1000 | 99 | 79 | 20 | 180 | 0/100 |
| 600 | 1000 | 99 | 79 | 40 | 160 | 0/100 |
| 600 | 1000 | 99 | 79 | 70 | 130 | 0/100 |
| 600 | 1000 | 99 | 79 | 100 | 100 | 0/100 |
| 600 | 1000 | 90 | 60 | 0 | 200 | 1/100 |
| 600 | 1000 | 90 | 60 | 20 | 180 | 0/100 |
| 600 | 1000 | 90 | 60 | 40 | 160 | 0/100 |
| 600 | 1000 | 90 | 60 | 70 | 130 | 1/100 |
| 600 | 1000 | 90 | 60 | 100 | 100 | 1/100 |
| 600 | 1000 | 74 | 54 | 0 | 200 | 2/100 |
| 600 | 1000 | 74 | 54 | 20 | 180 | 0/100 |
| 600 | 1000 | 74 | 54 | 40 | 160 | 0/100 |
| 600 | 1000 | 74 | 54 | 70 | 130 | 1/100 |
| 600 | 1000 | 74 | 54 | 100 | 100 | 1/100 |
| 600 | 1000 | 63 | 43 | 0 | 200 | 1/100 |
| 600 | 1000 | 63 | 43 | 20 | 180 | 0/100 |
| 600 | 1000 | 63 | 43 | 40 | 160 | 0/100 |
| 600 | 1000 | 63 | 43 | 70 | 130 | 1/100 |
| 600 | 1000 | 63 | 43 | 100 | 100 | 2/100 |
| 600 | 1000 | 58 | 38 | 0 | 200 | 0/100 |
| 600 | 1000 | 58 | 38 | 20 | 180 | 0/100 |
| 600 | 1000 | 58 | 38 | 40 | 160 | 1/100 |
| 600 | 1000 | 58 | 38 | 70 | 130 | 1/100 |
| 600 | 1000 | 58 | 38 | 100 | 100 | 2/100 |
| 600 | 1000 | 50 | 30 | 0 | 200 | 3/100 |
| 600 | 1000 | 50 | 30 | 20 | 180 | 0/100 |

TABLE 3-continued

| Sample size (μm) | | | | Base film (μm) Main-surface-covering | Electrically conductive thin film (μm) Ceramic-body-covering | Number of defectives |
|---|---|---|---|---|---|---|
| L | W | T | T' | dimension E1 | dimension E2 | in moisture resistance |
| 600 | 1000 | 50 | 30 | 40 | 160 | 1/100 |
| 600 | 1000 | 50 | 30 | 70 | 130 | 2/100 |
| 600 | 1000 | 50 | 30 | 100 | 100 | 2/100 |

As a result, in a case where the main-surface-covering dimension E1 of the base film 19 was 0 μm, moisture resistance was unstable and a short circuit occurred in some cases. Accordingly, it was confirmed that when the main-surface-covering portion 192 of the base film 19 is not formed on the main surface 11c, moisture infiltrates in between the base film 19 and the ceramic body 11, and the moisture resistance is made unstable. Further, it was confirmed that the defect rate is particularly low in a case where the main-surface-covering dimension E1 of the base film 19 is in the range of 20 to 40 μm, and samples with high moisture resistance are obtained.

Further, it was confirmed that in a case where the height dimension T' of the ceramic body 11, which is particularly low in height, is 30 μm or more and 60 μm or less, and in a case where the main-surface-covering dimension E1 is smaller than the height dimension T', the moisture resistance becomes sufficiently high.

4. OTHER EMBODIMENTS

Hereinabove, the embodiment of the present disclosure has been described, but the present disclosure is not limited to the embodiment described above, and it should be appreciated that the present disclosure may be variously modified without departing from the gist of the present disclosure. For example, the embodiment of the present disclosure can be an embodiment in which some embodiments are combined.

In the embodiment described above, the multi-layer ceramic capacitor 10 has been described as an example of a multi-layer ceramic electronic component, but the present disclosure can be applied to any other multi-layer ceramic electronic components each including a pair of external electrodes. Examples of such multi-layer ceramic electronic components include a chip varistor, a chip thermistor, and a multi-layer inductor.

What is claimed is:

1. A multi-layer ceramic electronic component, comprising:
   a ceramic body including
      a main surface facing in a first direction,
      an end surface facing in a second direction orthogonal to the first direction,
      a side surface facing in a third direction orthogonal to the first direction and the second direction, and
      internal electrodes laminated in the first direction; and
   an external electrode formed on a surface of the ceramic body, the external electrode including
      a base film including
         an end-surface-covering portion that covers the end surface, and
         a main-surface-covering portion that covers part of the main surface continuously from the end-surface-covering portion,
      an electrically conductive thin film including
         a base-covering portion that covers the main-surface-covering portion, and
         a ceramic-body-covering portion that extends from the base-covering portion in the second direction and covers part of the main surface, and
      a plating film that covers the electrically conductive thin film and the base film,
   wherein a first length of the multi-layer ceramic electronic component measured in the first direction is equal to or shorter than half of a second length of the multi-layer ceramic electronic component measured in the second direction, and wherein the first length of the multi-layer ceramic electronic component measured in the first direction is equal to or shorter than half of a third length of the multi-layer ceramic electronic component measured in the third direction,
   wherein the main-surface-covering portion has a main-surface-covering dimension of 10 μm or more and 100 μm or less in the second direction from an outer edge portion of the main surface in the second direction,
   wherein the ceramic-body-covering portion has a ceramic-body-covering dimension of 100 μm to 200 μm in the second direction from an end portion of the main-surface-covering portion in the second direction, and
   wherein the electrically conductive thin film is absent from the end surface.

2. The multi-layer ceramic electronic component according to claim 1, wherein
   the main-surface-covering dimension is 70 μm or less.

3. The multi-layer ceramic electronic component according to claim 1, wherein the first length of the multi-layer ceramic electronic component is 30 μm or more and 60 μm or less, and
   the main-surface-covering dimension being smaller than the first length of the multi-layer ceramic electronic component.

4. The multi-layer ceramic electronic component according to claim 1, wherein the first length of the multi-layer ceramic electronic component is 50 μm to 99 μm, the second length of the multi-layer ceramic electronic component is 600 μm to 1,000 μm, and the third length of the multi-layer ceramic electronic component is 500 μm to 1,000 μm.

* * * * *